United States Patent
Johnson et al.

(10) Patent No.: US 6,776,997 B2
(45) Date of Patent: Aug. 17, 2004

(54) TPE COMPOSITION THAT EXHIBITS EXCELLENT ADHESION TO TEXTILE FIBERS

(75) Inventors: Jim Johnson, Akron, OH (US); Marvin Hill, Hudson, OH (US)

(73) Assignee: Advanced Elastomer Systems, L.P., Akron, OH (US)

( * ) Notice: Subject to any disclaimer, the term of this patent is extended or adjusted under 35 U.S.C. 154(b) by 102 days.

(21) Appl. No.: 10/287,845

(22) Filed: Nov. 5, 2002

(65) Prior Publication Data

US 2003/0119988 A1 Jun. 26, 2003

Related U.S. Application Data

(62) Division of application No. 09/218,002, filed on Dec. 22, 1998, now Pat. No. 6,503,984.

(51) Int. Cl.[7] .......................... B32B 27/00; B32B 27/02; B32B 27/32; B32B 27/40
(52) U.S. Cl. ................. 424/424.8; 428/462; 428/474.4; 428/483
(58) Field of Search .................. 428/424.8, 462, 428/474.4, 483

(56) References Cited

U.S. PATENT DOCUMENTS

| | | |
|---|---|---|
| 4,130,534 A | 12/1978 | Coran et al. |
| 4,130,535 A | 12/1978 | Coran et al. |
| 4,621,115 A | 11/1986 | Morita et al. |
| 4,916,180 A | 4/1990 | Robinson et al. |
| 4,957,968 A | 9/1990 | Adur et al. |
| 5,030,682 A | 7/1991 | Nomura et al. |
| 5,039,730 A | 8/1991 | Yokoyama |
| 5,354,618 A | 10/1994 | Ishigaki et al. |
| 5,585,054 A | 12/1996 | Evans |
| 5,637,410 A | 6/1997 | Bonner et al. |
| 5,672,660 A | 9/1997 | Medsker et al. |
| 5,709,933 A | 1/1998 | Evans |
| 6,048,930 A | 4/2000 | Wang et al. |

FOREIGN PATENT DOCUMENTS

| | | |
|---|---|---|
| EP | 0 651 009 B1 | 5/1995 |
| EP | 0 753 027 B1 | 1/1997 |
| WO | WO 97/39059 | 10/1997 |

OTHER PUBLICATIONS

Corley et al, J. Macromol. Sci., Phys. B37(2), p. 265–273, 1998.

*Primary Examiner*—Jeffrey Mullis
(74) *Attorney, Agent, or Firm*—William A. Skinner; William G. Muller

(57) ABSTRACT

A combination of a low flexural modulus and low crystallinity polyolefin and a functionalized polyolefin were found to result in an olefin composition with excellent adhesion to metals and polar polymers (e.g. polyesters, polyamides, etc) especially fibers therefrom. When these two polyolefins were added to a thermoplastic vulcanizate (e.g. used to partially or fully replace the semicrystalline polyolefin of a thermoplastic vulcanizate), the thermoplastic vulcanizate was found to have the necessary adhesion to form fiber reinforced thermoplastic vulcanizate.

10 Claims, No Drawings

TPE COMPOSITION THAT EXHIBITS EXCELLENT ADHESION TO TEXTILE FIBERS

This application is a division of U.S. patent application Ser. No. 09/218,002, filed Dec. 22, 1998 now U.S. Pat. No. 6,503,984.

FIELD OF INVENTION

A polyolefin composition and a thermoplastic elastomer based upon a semi-crystalline polyolefin are described which have improved adhesion to polar polymers including textile fibers and metals including wires. A combination of a low flexural modulus (low crystallinity) polypropylene and a maleic anhydride functionalized polypropylene were found to exhibit excellent adhesion to textile fibers. Incorporation of these two components into a TPE (thermoplastic elastomer) imparts excellent adhesion of the TPE to textile fibers.

BACKGROUND OF INVENTION

Polyolefins and thermoplastic elastomers rich in polyolefins have traditionally had poor adhesion to textile fibers. Experiments with thermoplastic vulcanizates (TPV), a subset of thermoplastic elastomers (TPE), using formulations similar to those of U.S. Pat. Nos. 4,130,534 and 4,130,535 resulted in peel strengths of only 0.5 to 1.0 pounds per linear inch (pli) between the TPV and textile fibers after melt processing the TPV to the textile fibers. The industrial hose and belting markets generally require a peel strength of at least 8 to 12 pli for candidate matrix materials for fiber reinforced hoses and belting. While polyolefins and TPVs from polyolefins have benefits over plasticized polyvinyl chloride resin (in terms of chemical resistance and physical properties after aging) and over crosslinked rubbers (in terms of processability and physical properties after aging) their use with textile fibers has been limited due to low adhesion values (low peel strengths).

U.S. Pat. No. 4,957,968 teaches adhesive thermoplastic elastomer blends comprising a) at least a polyolefin modified by a chemically reactive functional group, b) at least one other polymer, and c) at least one olefinic elastomer.

Typically, when a polymer and a fiber exhibit poor adhesion toward each other, the problem is attributed to poor wetting of the fiber with the polymer or a lack of good interactions between the fiber surface and the polymer. If processing aids are not effective in solving the wetting problem, then different fibers or a different polymer is chosen or a sizing, more interactive with the specific polymer, is applied to the fiber.

SUMMARY OF INVENTION

A combination of two polymers was found that improves the interaction of polyolefins and/or thermoplastic vulcanizates (TPV) with more polar polymers and metals, especially various textile fibers and metal wires. More polar polymers are defined as those polymers more polar than polyolefins due to the inclusion of heteroatoms such as oxygen or nitrogen in the repeating groups. The first polymer is a low crystallinity polyolefin with a low flexural modulus (tangent) such as from about 5,000 to about 20,000 psi (34.5 to 138 MPa). It is hypothesized that the low flexural modulus helps reduce stress at the bond line between the polyolefin and the fiber and/or polar polymer. The first polymer may be characterized as a polyolefin polymer or copolymer with only 10 to 30 percent crystallinity. As described later the first polymer with low crystallinity and a low modulus may be a blend (reactor blend, physical blend, etc.) of a very low crystallinity polymer with a conventional semi-crystalline polyolefin. The second polymer is a functionalized polyolefin (e.g. semicrystalline polyolefin) with from about 0.5 to about 3.5 mole percent of functional repeating units. Preferred functional groups are carboxylic acid groups and/or anhydride from a di or poly carboxylic acid. For the purposes of this application the polyolefin can be derived from polymerizing monoolefins or from polymerizing diolefins and then hydrogenating them to obtain similar microstructures to polyolefins. These polyolefins from diolefins can be block copolymers with other monomers such as stryene.

In some embodiments, the functionalized polyolefin and the polyolefin with the low flexural modulus and low crystallinity are the only required components of a hot-melt composition with excellent adhesion to polar polymers and textile fibers.

In another embodiment, a crosslinked rubber is present so that the rubbery properties of a thermoplastic vulcanizate are present.

In yet another thermoplastic vulcanizate embodiment, both a conventional high modulus polyolefin and rubber are present. The high modulus polyolefin can increase the stiffness and/or increase the softening temperature of the composition for uses requiring stiffness or having a higher use temperature requiring a higher softening temperature for the TPV.

Any of the above compositions can be used to adhere to polar polymers, metal, high tensile strength fibers and/or sheets. The excellent adhesion attributed to the combination of functionalized polyolefin and low crystallinity and low flexural modulus polyolefin is well utilized in melt processing a thermoplastic vulcanizate around a fiber or metal (e.g. wire) reinforced assembly.

Hydrosilylation crosslinking is a particularly advantageous type of crosslinking for the rubber phase as it has minimal side reactions with the functionalized polyolefin allowing the functionalized polyolefin to be blended with the other components before crosslinking the rubber phase.

DETAILED DESCRIPTION

The components of the invention vary depending on the requirements of the particular application. Two polymers are common to all applications. They are the low crystallinity, low flexural modulus polyolefin and the functionalized polyolefin. Other components that can be added are a rubber phase (usually crosslinked by dynamic vulcanization), an additional one or more semicrystalline polyolefins with higher flexural modulus, and conventional additives to a hot-melt adhesive or thermoplastic vulcanizate.

The first polyolefin can also be described as a polyolefin with low levels of crystallinity as compared to a highly isotactic semicrystalline polypropylene. Desirably the first polyolefin has from about 10, 12, 14, or 15 to about 20, 25, 26.5, 30, or 32 weight percent crystallinity. The weight percent crystallinity can be determined by dividing the heat of fusion of the sample as received by the heat of fusion of 100% crystalline polypropylene (assumed to be 209 joules/g). The first polyolefin, with low flexural modulus (tangent), can generally be any polyolefin with low polyolefin crystallinity and a flexural modulus desirably from about 5,000 to about 20,000 psi (34.5–138 MPa), more desirably from about 7,500 to about 17,500 psi (51.7–121 MPa) and preferably from about 9,000 to about 16,000 psi (62 to 110.4 MPa). The flexural modulus is measured by ASTM D 790A test method at 23° C.

The first polyolefin can be a homopolymer with low crystallinity due to random or regular variations in tacticity, a copolymer that has low crystallinity due to the comonomer (s) and/or random or regular variations in tacticity (including blockly homo and copolymers), and polymers prepared by blending or grafting together oligomers or polymers. In particular, atactic and isotactic polypropylene (PP), in-situ blends, long isotactic PP sequence metallocene catalyszed ethylene-propylene copolymers (EP's), elastic PPs with stereoblocks of atactic PP and isotactic PP (which can be metallocene catalyzed), isotactic PPs with metallocene catalyzed asymmetrical stereoerrors, isotactic PP and atactic PP combinations by blending or by stereoblocks from mixed metallocenes, and PPs that have an atactic PP backbone with isotactic PP branches using metallocene catalysis. For the purpose of this application, both the terms polymer and copolymer will be interpreted as including copolymers, terpolymers, etc., so that polymer includes copolymer and copolymer includes a polymer from three or more monomers. Desirably, at least 70, 80, or 90 weight percent of the repeat units are from olefin monomers having from 2 to 8 carbon atoms and preferably at least 70, 80, or 90 weight percent are derived from propylene monomer. Examples of operative low flexural modulus, low crystallinity polymers are Rexflex® 101 from Huntsman in Houston, Tex., characterized as a reactor blend of atactic and isotactic propylene homopolymer having about 10 to about 20 wt. % crystallinity and Adflex® KS 357P from Montell North America in Wilmington, Del., characterized as a polyolefin with low weight percent crystalline content of 10 to 20 wt. %.

When the first polyolefin with low crystallinity and low flexural modulus is used in a thermoplastic vulcanizate, it is desirably used in an amount from about 10 to about 400 parts by weight and more desirably from about 12.5 or 15 to about 350 or 400 parts by weight per 100 parts by weight of total rubber in the TPV. It is also desirable that the polyolefin with low crystallinity and low flexural modulus be present from about 10 to about 350 parts by weight and more desirably from about 15 to about 75 or 85 parts by weight per 100 total parts of semi-crystalline polyolefin in the thermoplastic phase. When the polyolefin with low crystallinity and low flexural modulus is used in a non-TPV application, then it is desirably present in an amount from about 20 to about 90 parts by weight and more desirably from about 25 to about 75 or 85 parts by weight per 100 parts by weight total polyolefins.

For the purpose of this application the total semicrystalline polyolefins includes the functionalized polyolefin if it has greater than 26.5 or 30 weight percent crystallinity.

In lieu of the polyolefin with low crystallinity and low flexural modulus one may be able to use a generally amorphous polyolefin (a polyolefin having less than 10 weight percent crystallinity and preferably less than 3 weight percent crystallinity) which will blend with a semicrystalline polyolefin such as isotactic polypropylene. This generally amorphous polyolefin is different than EPDM rubber in that it desirably has at least 75 mole percent and more desirably at least 80, 85, or 90 mole percent repeating units from a single olefin monomer, preferably propylene. This substitution is taught in WO 97/39059 as an alternative for the products marketed under the Rexene™ and Rexflex™ names. When the amorphous polyolefin is used in lieu of a low crystallinity polyolefin it should be used in an amount from about 5 to about 200 parts by weight, more desirably from about 6 or 7.5 to about 125 or 150 parts by weight per 100 parts total weight of rubber in the TPV. When the amorphous polyolefin is used in lieu of a low crystallinity polyolefin it should be used in an amount from about 5 to about 75 parts by weight, more desirably from about 7.5, to about 37 or 43 parts by weight per 100 parts total weight of semi-crystalline polyolefins in the thermoplastic phase. For the purpose of this application polyolefins with less than 10 weight percent crystallinity will be considered as amorphous.

The functionalized polyolefin desirably has from about 0.5 to about 3.5 mole percent functional groups, and more desirably from about 1 or 1.5 to about 2.0 or 2.5 mole percent functional groups based upon total repeating units in the polymer. The functional groups may be from monomers copolymerized with the olefin monomers or may be added by post-polymerization functionalization such as by grafting unsaturated monomers onto polyolefins as documented by U.S. Pat. No. 5,637,410 to BP Chemicals Limited which describes carboxylic acid grafting in columns 1 and 2. Desirably, at least 70, 80, or 90 weight percent of the repeating units for this polyolefin are olefin monomers of 2 to 8 carbon atoms and more preferably 2 or 3 carbon atoms. For the purposes of this application, functional groups will be defined as groups with heteroatoms other than carbon and hydrogen. Examples of functional groups include carboxylic acid groups, anhydrides from dicarboxylic or polycarboxylic acids, such as the group derived from grafting maleic anhydride to a polyolefin backbone. Preferred groups are carboxylic acid groups or anhydrides of two or more carboxylic acids. Thus the functionalized polyoletin can be a copolymer of acrylic acid and ethylene or propylene; a terpolymer of ethylene, vinyl acetate and acrylic acid; or a terpolymer of ethylene, methyl acrylate, acrylic acid; etc.

The polyolefin which is functionalized to make the functionalized polyolefin is desirably made from monoolefins so that it is compatible with the semicrystalline polyolefin phase. However there are other polymers having hydrogenated blocks made from from diolefins (e.g. conjugated dienes having from 4 to 8 carbon atoms) which polymer blocks are chemically indistinguishable from polyolefins polymerized from monoolefins by chemical analysis and have compatibility with the semicrystalline polymers made from monoolefins due to the similarities of their microstructure and their composition. For the purposes of this application these block copolymers with blocks of hydrogenated polydienes will be defined as polyolefins due to their equivalence to conventional polyolefins made from monoolefins. These polymers include homopolymers and block copolymers comprising blocks of polydiene that are subsequently hydrogenated. Blocks of hydrogenated polyisoprene look like perfectly random copolymers of ethylene and propylene. Blocks of hydrogenated polybutadiene look like copolymers of 1,2-butylene and ethylene. Commercially available hydrogenated blocky copolymers of dienes and styrene can function as the starting material for functionalized polyolefins due to the equivalence of the hydrogenated diene blocks to a polyolefin made from monoolefins. The polymer backbone of the functionalized material can also be a maleic anhydride modified hydrogenated styrene/butadiene/styrene (SBS) and/or hydrogenated styrene/butadiene/styrene (SEBS).

When the functionalized polyolefin is used in a thermoplastic vulcanizate (TPV) it is desirably used in an amount from about 10 or 15 to about 200 parts by weight, more desirably from about 15 or 20 to about 100 or 200 and preferably from about 40 to about 80 parts by weight per 100 parts by weight of rubbers in the TPV. It is also desirable that the functionalized polyolefin be present in an amount from about 10 to about 60 parts by weight and more desirably from about 12.5 to about 50 parts by weight per 100 total parts of polyolefin in the thermoplastic phase. When the functionalized polyolefin is used in a non-TPV application, it is desirably present in an amount from about 5 to about 60 parts by weight and more desirably from about 10 to about 50 parts by weight per 100 parts by weight total polyolefins.

A second semicrystalline polyolefin with higher flexural modulus can optionally be used in any of the embodiments. The higher flexural modulus is higher than the polyolefin with low crystallinity and low flexural modulus. This higher flexural modulus polymer desirably has a flexural modulus measured by ASTM D 790A of at least 30,000 psi (205 MPa) and more desirably at least 45,000 psi (310 MPa). The polymer can be made by any known polymerization process including low pressure and high pressure processes. The monomers are desirably olefins having from 2 to 8, 10, or 12 carbon atoms. Desirably, the second semicrystalline polyolefin has at least 70, 80, or 90 weight percent of repeat units from olefin monomers with the residual repeat units, if any, selected from copolymerizable monomers. The second semicrystalline polyolefin may be present to increase the amount of the polyolefin phase, which may be desirable to increase the processability of the composition or the hardness of the composition. The amount of a second semicrystalline polyolefin in a TPV, when present, is desirably in amounts up to 300 parts by weight and more desirably from about 5 to about 200, 250 or 300 parts by weight per 100 parts by weight of rubber. Desirably, in applications requiring the elastic properties of a TPV, the total polyolefins (polyolefin with low flexural modulus, functionalized polyolefin, and optional second polyolefin) are present in amount from about 20 to about 450 parts by weight per 100 parts by weight of rubber.

For the purposes of this application the semicrystalline polyolefins will include polyolefins with a at least 26.5 wt. % crystallinity. The functionalized polyolefin and any other semicrystalline polyolefins will be included in calculations for total semicrystalline polyolefins provided they have at least 26.5 wt. % crystallinity. It will not include rubbers such as EPDM rubber, which is a polyolefin but is generally defined as amorphous or essentially non-crystalline.

The rubber component can be any rubber suitable for use in a thermoplastic vulcanizate. These rubbers include ethylene-propylene-diene rubber (EPDM) (e.g. copolymer of two or more alphamonoolefins in weight ratios of 25:75 to 75:25 [if three or more monoolefins are used the then two have to be each be present in an amount of at least 25 weight percent of the total] with 0.2 to 10 wt % of repeating units from a polyene with 5 to 15 carbon atoms based on the weight of the EPDM); various isobutylene copolymers such as butyl rubber copolymers of isobutylene and p-methylstyrene, butyl rubber copolymers of isobutylene and a diene (including brominated and chlorinated versions), and copolymers or terpolymers of isobutylene and divinyl aromatic monomers; natural rubber; homopolymers of conjugated dienes having from 4 to 8 carbon atoms, optionally including halogens, such as polybutadiene, synthetic isoprene, and chloroprene rubber; or copolymers having at least 50 weight percent repeating units from said conjugated dienes, such as styrene-butadiene rubber and/or nitrile rubber: and combinations thereof.

While the description above is generally adequate for the rubbers in general in thermoplastic vulcanizates, in some embodiments using hydrosilylation crosslinking the preferred rubbers are as set forth below. Hydrosilylation crosslinking is taught in U.S. Pat. Nos. 4,803,244 and 5,672,660 hereby incorporated by reference. The preferred rubbers are those with residual carbon to carbon double bond unsaturation that is pendant to the polymer backbone and sterically unhindered with respect to reaction with the hydrosilylation crosslinking agent. Preferred rubbers with such sterically unhindered bonds react quickly with low concentrations of hydrosilylation crosslinking agent and low concentrations of catalyst.

Preferred rubbers for hydrosilylation crosslinking include rubbers from two or more α-monoolefins, copolymerized with a polyene, usually a non-conjugated diene such as EPDM rubber, previously described. Useful polyenes include 5-ethylidene-2-norbornene (ENB); 1,4-hexadiene (HD); 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); 5-vinyl-2-norbornene (VNB) and the like, or a combination thereof. 5-vinyl-2-norbornene (VNB) is a preferred polyene in EPDM for hydrosilylation crosslinking.

Another preferred rubber for hydrosilylation crosslinking is a copolymer or terpolymer of isobutylene and divinyl aromatic compounds. These polymers are described in U.S. Pat. Nos. 4,916,180 and 2,671,774, hereby incorporated by reference. These polymers desirably comprise from about 94 to about 99 or 99.5 weight percent repeating units from isobutylene, from about 0 or 0.5 to about 3 or 5 weight percent repeating units from a conjugated diene and from about 0.5 to about 3 or 5 weight percent repeating units from a divinyl aromatic monomer having the formula

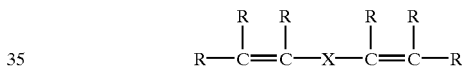

wherein X is an aromatic (aryl) or an alkyl substituted aromatic moiety, and each R may be the same or different and is selected from hydrogen or a $C_{1-5}$ alkyl. Divinyl benzene is a preferred example of the above divinyl aromatic monomer.

Another preferred rubber is a copolymer of isobutylene and para-methylstyrene which is post-polymerization functionalized with a halogen on the paramethyl group and then functionalized by replacing the halogen with an acrylic or alkacrylic group. This type of substitution chemistry on copolymers of isobutylene and para methylstyrene is taught in U.S. Pat. No. 5,162,445 hereby incorporated by reference. This addition of the acrylic or alkacrylic group is well known to the art and involves the reaction of

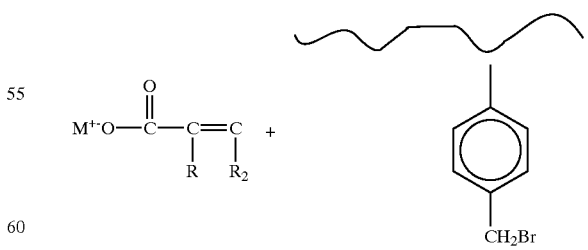

where $M^+$ is a metal ion such as $Na^+$ or $K^+$ and Br is bromine, an example of a halogen, the remainder of the isobutylene-paramethylstyrene is represented by the squiggly line, and each R group is independently H or an alkyl or alkylene of 1 to 4 carbon atoms. The product is

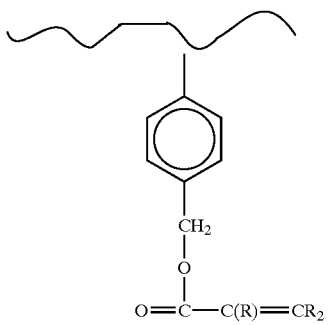

The curative or crosslinking system for the rubber can be any system conventionally used for thermoplastic vulcanizates. These include peroxide, azide, sulfur, phenolic resin and accelerated sulfur-vulcanizing agents. The combination of maleimide and disulfide accelerator can be used. Other curatives such as those used for butyl rubber include sulfur, phenolic resin, metal oxide, p-quinone dioxime, or bis-maleimide vulcanizing system. Halogenated butyl rubbers can be crosslinked with zinc oxide. The curatives or crosslinking systems are used in conventional amounts for crosslinking the rubber based upon the weight of the rubber component.

Alternatively, the crosslinking system can comprise a hydrosilylation crosslinking system such as described in U.S. Pat. Nos. 4,803,244 and 5,672,660, hereby incorporated by reference. Preferred silicon hydride compounds (hydrosilylation crosslinkers) include compounds of the formula

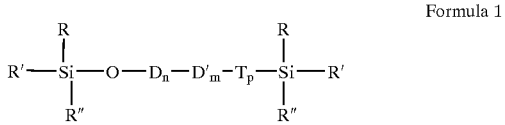

Formula 1 wherein each R is independently selected from the group consisting of alkyls comprising 1 to 20 carbon atoms, cycloalkyls comprising 4 to 12 carbon atoms and aryls. In formula (1) it is preferred that each R be independently selected from a group consisting of alkyls comprising 1 to 6 carbon atoms. Even more preferred is R=methyl, R' represents a hydrogen atom, an alkyl or alkoxy group having from 1 to about 24 carbon atoms. R" represents R or a hydrogen atom.

D represents the group

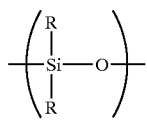

D' represents the group

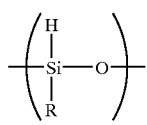

T represents the group

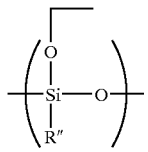

m is an integer having a value ranging from 1 to 50, n is an integer having a value ranging from 1 to 50, and p is an integer having a value ranging from 0 to 6.

Particularly preferred polyorganosiloxanes are those in which the silicon atom of the silicon hydride functionality is bound by heteroatoms/atoms having lone pairs of electrons. The preferred polyorganosiloxanes may also be substituted with appropriate functionality permitting solubility in the reaction media. A type of this functionalization is described in U.S. Pat. No. 4,046,930, which teaches alkylation of polyorganosiloxanes. The weight percent of alkylation should be limited to a level that permits adequate reaction rates and minimizes steric constraints.

The amount of silicon hydride compound useful in the process of the present invention can range from about 0.1 to about 10.0 mole equivalents of SiH per mole of carbon-carbon double bond in the rubber, and preferably is in the range of about 0.5 to about 5.0 mole equivalents of SiH per carbon-carbon double bond in the rubber component of the thermoplastic elastomer.

It has generally been understood that any hydrosilylation catalyst, or catalyst precursor capable of generating a catalyst in situ, which will catalyze the hydrosilylation reaction with the carbon-carbon bonds of the rubber, can be used. Such catalysts have included transition metals of Group VIII such as palladium, rhodium, platinum and the like, including complexes of these metals. Chloroplatinic acid has been disclosed as a useful catalyst in U.S. Pat. No. 4,803,244 and European Application No. 651,009, which further disclose that the catalyst may be used at concentrations of 5 to 10,000 parts per million parts by weight rubber and 100 to 200,000 parts per million parts by weight rubber, respectively.

Significantly lower concentrations of platinum-containing catalyst can be used, while obtaining improvement in both the speed of the reaction and the efficiency of the crosslinking. Concentrations of catalyst in the range of about 0.01 to about 20, 40 or 50 parts per million parts by weight of rubber, expressed as platinum metal, in combination with a diene-containing rubber having carbon-carbon multiple bonds which are predominately sterically unhindered, are effective in rapidly and completely curing the rubber in the process of dynamically vulcanizing blends of thermoplastic resin and rubber. Catalyst concentrations of about 0.1 to about 4 or 40 parts per million by weight expressed as platinum metal, and based on the weight of rubber, are particularly preferred.

Platinum-containing catalysts, which are useful in the process of the invention, are described, for example, in U.S. Pat. Nos. 4,578,497; 3,220,972; and 2,823,218, all of which are incorporated herein by this reference. These catalysts include chloroplatinic acid with symdivinyl-tetramethyldisiloxane, dichioro-bis (triphenylphosphine) platinum (II), cis-dichloro-bis (acetonitrile) platinum (II), dicarbonyidichloroplatinum (II), platinum chloride and platinum oxide. Zero valent platinum metal complexes such as Karstedt's catalyst are particularly preferred.

In order for the catalyst to function most efficiently in the dynamic vulcanization environment, it is important that it is inherently thermally stable, or that its activity is inhibited to prevent too rapid a reaction or catalyst decomposition. Appropriate catalyst inhibitors that are suitable To stabilize the platinum catalyst at high temperature include 1,3,5,7-tetravinyltetramethylcyclotetrasiloxane and its higher analogs such as vinyl cyclic pentamer. However, other olefins that are stable above 165° C. are also useful. These include maleates, fumarates and the cyclic pentamer. It is also particularly preferred in the invention to use a catalyst that remains soluble in the reaction medium.

The thermoplastic elastomer may contain conventional additives, which can be introduced into the composition in the thermoplastic resin, the rubber, or in the blend before, during or after curing. Examples of such additives are antioxidants, processing aids, reinforcing and non-reinforcing fillers, pigments, waxes, rubber processing oil, extender oils, antiblocking agents, antistatic agents, ultraviolet stabilizers, plasticizers (including esters), foaming agents, flame retardants and other processing aids known to the rubber compounding art. Such additives may comprise from about 1 to about 300 percent by weight based on the weight of the total polyolefins and rubber in the final thermoplastic elastomer product. Fillers and extenders, which can be utilized, include conventional inorganics such as calcium carbonate, clays, silica, talc, titanium dioxide, carbon black and the like. The rubber processing oils generally are paraffinic, naphthenic or aromatic oils derived from petroleum fractions. The type will be that ordinarily used in conjunction with the specific rubber or rubbers present in the composition, and the quantity of processing oil based on the total rubber content of the thermoplastic elastomer may range from zero or 50 to several hundred parts by weight per hundred parts by weight of rubber. Important to the efficiency of the catalyst is that the oils and other additives contain no or very low concentrations of compounds that interfere with the activity of the catalyst. These include phosphines, amines, sulfides or other compounds that may be classified as Lewis bases.

The rubber component of the thermoplastic elastomer is generally present as small, i.e. micron-size particles within a continuous thermoplastic resin matrix, although a co-continuous morphology or a phase inversion is also possible depending upon the amount of rubber relative to plastic and the degree of cure of the rubber. The rubber is desirably at least partially crosslinked, and preferably is completely or fully crosslinked. It is preferred that the rubber be crosslinked by the process of dynamic vulcanization. As used in the specification and claims, the term "dynamic vulcanization" means a vulcanization or curing process for a rubber blended with a thermoplastic resin, wherein the rubber is vulcanized under conditions of shear at a temperature at which the mixture will flow. The rubber is thus simultaneously crosslinked and dispersed as fine particles within the thermoplastic resin matrix, although as noted above other morphologies may exist. Dynamic vulcanization is effected by mixing the thermoplastic elastomer components at elevated temperatures in conventional mixing equipment such as multiple-roll roll mills, Banbury mixers, Brabender mixers, continuous mixers, mixing extruders and the like. Generally after a reasonably homogenous mixture of the two phases is established, the curatives are added. Mixing is continued until maximum mixing torque is reached. Thereafter mixing is continued one or two minutes. The unique characteristics of dynamically cured compositions is that, notwithstanding the fact that the rubber component is partially or fully cured, the compositions can be processed and reprocessed by conventional plastic processing techniques such as extrusion, injection molding and compression molding. Scrap or flashing can be salvaged and reprocessed.

It is preferred to prepare a dynamic vulcanizate as described above when using peroxide, sulfur, and the phenolic curatives. Peroxide curatives may cause some chain scission of polyolefins. The functionalized polyolefin is generally, but not necessarily, added after curing the rubber phase, to avoid any chemical interaction between the curative and the functional groups of the functionalized polyolefin. The addition of the functionalized polyolefin can occur in the same equipment or separate equipment from the preparation of the thermoplastic vulcanizate. The polyolefin with the low crystallinity and low flexural modulus can be added in any stage of the processing, e.g. before or after curing the rubber phase. Commercial thermoplastic vulcanizates can be converted to thermoplastic vulcanizates with excellent adhesion to textile fibers, by adding during melt blending appropriate amounts of functionalized polyolefin and polyolefin with low crystallinity and low flexural modulus.

As the hydrosilylation crosslinking system does not appreciably react with maleic anhydride functionalized polyolefin, the functionalized polyolefin can be added before the crosslinking (curing) step eliminating the extra addition step after crosslinking.

The polar polymer can be any polymer more polar than polyolefins. The polar polymer can be a molded or shaped article onto which a thermoplastic coating is applied or it may be in the form of sheets or fibers. Desirably the polar polymer and the fiber or sheet reinforcement may be any high tensile modulus material (e.g. above 130,000 psi, more desirably above 180,000 psi) that can desirably be formed into fibers or sheets. Examples include polyesters, polyamides, glass fibers, natural fibers such as cellulosic, etc. The fibers can be woven, bundled, yarns, non-woven, etc. In addition polyolefin polymers may be used to make the fibers or blends of polyolefins and the polar polymers may form the fibers, or blends of polyolefin fibers and polar polymer fibers may be used.

The hot melt adhesive or the thermoplastic vulcanizate of this disclosure also adheres well to metallic substrates. Thus they may be used as a coating on metallic parts, sheets, or fibers (wires) or used to form molded or shaped parts that include metal such as sheets or wires as part of or adhered to a molded or shaped article. Examples of products formed with these thermoplastic vulcanizates include covers for hydraulic hoses, tube and cover for fire fighting hoses, belting, roofing, etc.

EXAMPLES

The results reported in Tables II–VI were prepared by melt blending the added components to a preformed thermoplastic vulcanizate described in Table I. The results in Table VII was a simple hot melt adhesive formed by melting a polyolefin and a functionalized polyolefin. The compositions in Tables VIII and IX were prepared by adding the functionalized polyolefin before crosslinking with a catalyzed hydrosilylation crosslinking agent.

Table I is a formulation for a generic thermoplastic vulcanizate. The thermoplastic vulcanizate is conventionally prepared as described in U.S. Pat. No. 4,130,535.

TABLE I

Thermoplastic Vulcanizate

|  | Parts by wt. | wt. % |
| --- | --- | --- |
| EPDM rubber | 100 | 30.7 |
| Polypropylene | 41 | 12.6 |
| Stannous Chloride | 1.3 | 0.4 |
| Extender Oil | 130 | 39.9 |
| Clay | 42 | 12.9 |
| Zinc Oxide | 2.0 | 0.6 |
| Phenolic Resin | 4.5 | 1.4 |
| Wax | 5.0 | 1.5 |
| Total | 325.8 | 100 |

Various commercially available functionalized polyolefins were added in various amounts to thermoplastic vulcanizate prepared according to the recipe of Table I. The examples were prepared by compression molding the blend of the functionalized polyolefin and the thermoplastic vulcanizate to a nylon 6,6 and polyester fiber blend substrate at 425° F. for 5 minutes of a 15 minute cycle time.

TABLE II

180° Peel Strength Versus Level of Three Different Functionalized Olefins

| Parts Functionalized Polyolefin* | Fusabond ™ PMD-353D | Polybond 300 | Bynel ™ 41E558 |
| --- | --- | --- | --- |
| 32.6 | 8 pli | — | — |
| 48.9 | 13 | 9 pli | — |
| 61.4 | 12 | 8 | 6 pli |
| 81.5 | 17 | — | — |
| 97.7 | 15 | 14 | 9 |
| 130.3 | — | — | 13 |

*by weight per 100 parts by weight of EPDM rubber
pli means pounds per linear inch of width

TABLE III

90° Peel Strength Versus Level of Three Different Functionalized Olefins

| Parts Functionalized Polyolefin* | Fusabond ® PMD-353D | Polybond ™ 3000 | Bynel ™ 41E558 | Exxelor ™ NDEX 94-6 |
| --- | --- | --- | --- | --- |
| 32.6 | 6.5 pli | 9 pli | — | — |
| 48.9 | 11 | 8 | — | 6 pli |
| 65.2 | 11 | 9 | 7 pli | 12 |
| 81.5 | 26 | 11 | — | 11 |
| 97.7 | 36 | 11 | 9 | — |
| 130.3 | — | — | 18 | — |

*by weight per 100 parts by weight of EPDM rubber

As can be seen from Tables II and III, Fusabond® PMD-353D gives greater increases in adhesion than the other three functionalized polyolefins, especially when the object is to achieve adhesion above 10 or 12 pli (pounds per linear inch). Fusabond® PMD-353D is a maleic anhydride functionalized polypropylene random copolymer which is advertised as being 1.5% by weight grafted maleic anhydride by its manufacturer Dupont Canada, Inc.

Tables IV and V were prepared to determine the effect of the various functionalized polyolefins on critical properties such as Shore A hardness elongation at break by ASTM D2240, and 100% modulus.

TABLE IV

Shore A Hardness Versus Level of Four Functionalized Polyolefins

| Parts Functionalized Polyolefin* | Fusabond ® PMD-353D | Polybond ™ 3000 | Bynel ™ 41E558 | Exxelor ™ NDEX 94-6 |
| --- | --- | --- | --- | --- |
| 32.6 | 71 | 78 | — | — |
| 48.9 | 73 | 83 | — | 82 |
| 65.2 | 81 | 86 | 72 | 86 |
| 81.5 | 87 | 90 | — | 89 |
| 97.7 | 88 | 93 | 76 | — |
| 130.3 | — | — | 80 | — |

*by weight per 100 parts by weight of EPDM rubber

TABLE V

Elongation at Break (%) Versus Level of Four Functionalized Polyolefins

| Parts Functionalized Polyolefin* | Fusabond ® PMD-353D | Polybond ™ 3000 | Bynel ™ 41E558 | Exxelor ™ NDEX 94-6 |
| --- | --- | --- | --- | --- |
| 32.6 | 320 | 325 | — | — |
| 48.9 | 315 | 380 | — | 375 |
| 65.2 | 380 | 400 | 460 | 380 |
| 81.5 | 355 | 250 | — | 300 |
| 97.7 | 430 | 120 | 480 | — |
| 130.3 | — | — | 580 | — |

*by weight per 100 parts by weight of EPDM rubber

TABLE VI

100% Modulus Versus Level of Four Functionalized Polyolefins

| Parts Functionalized Polyolefin* | Fusabond ® PMD-353D | Polybond ™ 3000 | Bynel ™ 41E558 | Exxelor ™ NDEX 94-6 |
| --- | --- | --- | --- | --- |
| 32.6 | 620 psi | 650 psi | — | — |
| 48.9 | 700 | 800 | — | 750 psi |
| 65.2 | 790 | 960 | 500 psi | 880 |
| 81.5 | 910 | 1100 | — | 940 |
| 97.7 | 1010 | 1240 | 550 | — |
| 130.3 | — | — | 600 | — |

*by weight per 100 parts by weight of EPDM rubber

An adhesion value of at least 12 pli was desired with minimal changes on Shore A hardness, tensile strength and 100% modulus. The preferred functionalized polyolefin was Fusabond® PMD353D, which allowed compositions to meet the 12 pli value with as little as 48.9 or 65.2 parts by weight of Fusabond® based upon 100 parts by weight of the rubber as shown in Tables II and III. The next best functionalized polyolefin was Polybond® 3000, a 1.0 to 1.5% maleic anhydride modified isotactic polypropylene which was used at the 65.2 or 81.5 parts by weight level to achieve 12 pli adhesion. The other functionalized polyolefins were less effective.

Generally, as seen in Tables IV and VI, all the functionalized polyolefins increased the Shore A hardness and 100% modulus of the examples, Exxelor™ NDEX 94-6 had less effect on these tests than the other materials. The elongation at break (Table V) varied with the amount of functionalized polyolefin.

The fact that less Fusabond® PMD353D can be used and still meet the 12 pli adhesion value means it is a preferred functionalized polyolefin. Bynels®contribution to hardness was less due to its polyethylene backbone. The Exxelor™ and Polybond® systems became brittle at higher loadings as seen by their lower elongation at break values at higher loadings.

While the compression molded samples could meet the 12 pli adhesion requirement, compression molding does not emulate extrusion (sheet or cross-head) sufficiently well to duplicate adhesion values in commercial fiber reinforced hose production. Extrusion is typically used in the hose industry. When the samples with 48.9 parts by weight of Fusabond® in the previous tables were fabricated into parts by extrusion, the adhesion values fell to values from 10 or 13 pli (Tables II and III) to 6 pli.

A series of polypropylenes were formulated as hot-melt adhesives with Fusabond® P-353MD to determine if adhesion could be further increased by modifying the polypropylene. The melt flow (measured in g/10 min) and the Peel Strength of the various polypropylenes blends are included in Table VII below as it was initially postulated that higher melt flow polyethylenes would better adhere to textile fibers due to increased flow and better wetting.

TABLE VII

Melt Flow of Various Polypropylenes and Peel Strength of Their 85:15 Blends with Fusabond ®

|  | Melt Flow | Peel Strength of Blend |
|---|---|---|
| Equistar 51S07A | 1 | 12 |
| Rexflex W105 | 2 | 18 |
| PD9272 | 3 | 18 |
| Esc 7032 (Impact PP) | 4.5 | 12 |
| Fina 94-21 (Random PP) | 5 | 23 |
| Rexflex W107 | 10 | 17 |
| Rexflex W101 | 14 | 50 |
| FP200 | 20 | 20 |
| Adflex KS357P | 25 | 48 |
| FP300 | 30 | 24 |

The polymer blends from Rexflex® W101 from Huntsman and Adflex® KS357P from Montell gave dramatically superior adhesion to Nylon 6/6 woven fabric than the other polypropylene blends. The samples were prepared by compression molding at 425° F. for 5 min. as part of a 15 min cycle. Surprisingly, there was no correlation between melt flow and adhesion. The two superior polypropylenes were differentiated from the others based upon low crystallinity and lower flexural modulus. The crystallinity of Rexflex® W101 was 12–18 and the crystallinity of Adflex® KS357P was 15–20 wt.%. The flexural modulus (tangent) of Rexflex® W101 was 8,000–15000 psi and the flexural modulus (tangent) of Adflex® KS357P was 10,000–17,000 psi.

The following Table VIII illustrates two thermoplastic vulcanizates (one with a Shore A hardness of 65 and another with 85) with excellent adhesion to textile fibers. The EPDM rubber is Exxon VX 1696 having about 0.7 wt. % of 5-vinyl-2-norborne as the diene component. The first PP (polypropylene) is Rexflex® W101 available from Huntsman. It is a low crystallinity and low flexural modulus polyolefin. The second PP is a conventional polypropylene with a melt flow of 5.0. Fusabond® is the functionalized polyolefin as previously described. The silicon hydride 2-2822 is a hydrosilylation crosslinker available from Dow Corning. The Pt catalyst is PC 085 available from United Chemicals Technology. The platinum catalyst solution is only 1.1 wt. % active in oil and only 2 wt.% of the catalyst is Pt. Therefore, the amount of catalyst in the recipe is specified by 11 ppm of Pt metal.

TABLE VIII

TPV CC8E3068 and CC8E3085

| Textile bondable TPVs ingredients | 65 Shore A CC8E3068 W8F800-01 Parts | Wt. % | 85 Shore A CC8E3085 W8F801-01 parts | Wt. % |
|---|---|---|---|---|
| EPDM rubber* | 200 | 49.0% | 200 | 41.4% |
| First PP Rexflex ® | 60.1 | 14.7% | 73.7 | 15.3% |
| Second PP | 32.0 | 7.9% | 98.1 | 20.3% |
| Fusabond ® PMD 353-D | 61.1 | 15.0% | 73.7 | 15.3% |
| Clay | 6 | 1.5% | 30.5 | 6.3% |
| Oil, Sunpar LW150M | 41.1 | 10.2% | 0 | 0.0% |
| Silicon Hydride 2-2822 | 2 | 0.5% | 2 | 0.4% |
| Pt Catalyst Solution | 5 | 1.2% | 5 | 1.0% |
| TOTAL | 407.7 | 100.0% | 482.9 | 100.0% |

*The EPDM rubber in this table was 100 g of rubber and 100 g of oil.

These two materials were compounded using a one-step process on a 53 mm twin screw extruder. The one step process means the functionalized polyolefin was added and blended with the other component before crosslinking occurred. These two materials have demonstrated excellent adhesion to both untreated nylon 6/6 and polyester woven fibers. The 3068 formulation demonstrated 27 pli peel strength to polyester fibers and 28 pli peel strength to the nylon 6/6 fibers. The 3085 formulation demonstrated 35 pli peel strength to the polyester fibers and 24 pli peel strength to the nylon 6/6 fibers.

Another formulation TPV 13067-10 in Table IX below having a 65 Shore A hardness was prepared using a twin screw extruder and adding the functional polyolefin in a second pass after curing the rubber. The low crystallinity and low flexural modulus polyolefin was already present in the TPV. Compression molded samples of this material had adhesion of 18 pli to polyester fiber and 22 pli to nylon 6/6 fiber. Then the material was extruded with nylon 6/6 using cross-head extruder. The extruded sample had an adhesion value of 25 pli to the nylon 6/6 fibers, well exceeding the hose industries' 12 pli minimum adhesion, and this confirmed the positive laboratory results of 22 pli adhesion to nylon 6/6 using compression molding.

TABLE IX

TPV 13067-10 Formulation

| Ingredient | Chemical | WT. % |
|---|---|---|
| Exxon VX 1696 | EPDM Rubber (VNB) | 48.7 |
| Rexene W-101 | Low viscosity-Low Modulus Polyolefin | 14.6 |
| Fina EOD 94-21 | Random Copolymer (high ethylene content) | 7.8 |
| Fusabond PMD 353D | Maleic anhydride mod. atactic PP | 15 |
| Fluid 2-2822 | SiH curative | 0.5 |
| Sunpar LW150M | Oil | 1.2 |
| PC 085 | Catalyst | 0.0012 |
| Irganox B215 | AO stabilizer | 0.17 |
| Kemamide | Processing Aid | 0.44 |
| Sunpar LW150M | Oil | 7.3 |
| Magnesium Carbonate | Partitioning Agent | 1.4 |

Table X illustrates two butyl rubber based thermoplastic elastomers wherein the butyl rubber was cured by hydrosilylation crosslinking. Bayer XL 1000 is believed to be a terpolymer of isobutylene, isoprene, and divinylbenzene with the Isobutylene being about 95 wt.% or more and the other two monomers only providing crosslinking sites. The Rexene W101 and Fusabond PMD 353D can be added prior to crosslinking the butyl rubber as there is little interaction between the hydrosilylation crosslinking agent and the functionalized polyolefin (Fusabond PMD 353D)

TABLE X

Butyl Rubber based Textile Bondable Formulations

| Raw Material | 13080-05 Level (phr) | 13080-06 Level (phr) |
|---|---|---|
| Bayer XL 10000 (butyl rubber) | 100. | 100 |
| Clay | 5.98 | 6.04 |
| Fina 94-21 (PP) | 31.96 | 85.20 |
| Rexene W101 | 66.18 | 63.90 |
| Fusabond PMD353D | 54.90 | 63.90 |
| SiH | 2.01 | 1.99 |
| Pt Catalyst | 5.00 | 5.00 |
| Sunpar 150 oil #1 | 63.38 | 64.47 |
| Sunpar 150 oil #2 | 36/60 | 35.50 |
| Total | 366.01 | 426 |
| Properties | | |
| UTS (psi) | 764 | 1016 |
| Elongation (%) | 402 | 445 |
| 100% Modulus | 462 | 633 |
| Hardness (Shore A) | 69 | 80 |
| Tension Set | 23 | 30 |
| Adhesion (180) (pli) | | |
| Nylon 6,6 fiber | 28 | 39 |
| Polyester fiber | 31 | 34 |

Table XI below shows a thermoplastic vulcanizate according to this disclosure that was cured with peroxide (VulKup 40%) and then blended with Rexflex W101 (a low flexural modulus polyolefin) and Fusabond PMD 353D (a maleic anhydride functionalized polyolefin). The resulting product had excellent adhesion to nylon 6,6 and polyester fiber.

TABLE XI

Peroxide Cured Textile Bondable Formulations

| Raw Material | 13082–10 Level (phr) |
|---|---|
| MDV 95-1-2 | 140 |
| Equistar 51SO7A (PP isotactic) | 42 |
| White Oil | 35 |
| Stanwhite 500 (CaCO₃) | 42 |
| TAC (50%) tri-allyl cyanuarate | 3.3 |
| Vulkup 40 KE (40% active) bis-(tertiary butyl)diisopropylbenzene | 1.6 |
| Rexflex W101 | 56.55 |
| Fusabond PMD353D | 56.55 |
| Total | 377 |
| Adhesion (180) (pli) | |
| Nylon 6,6 fiber | 23 |
| Polyester fiber | 22 |

MDV 95-1-2 is 100 parts EPDM rubber with 3% VNB and 40 parts by weight oil.

The thermoplastic vulcanizate compositions of this disclosure are useful as matrix materials for a variety of fiber and/or metal reinforced materials such as hoses, tubing, fiber reinforced sheeting or membranes, belting, wire reinforced articles, metal rubber composites, etc. The blends of low flexural modulus polyolefin and functionalized polyolefin are useful as thermoplastics with excellent adhesion to molded articles, textile fibers, and/or metal or as adhesives, either alone or used to bond a thermoplastic vulcanizate to a high modulus fiber or sheet.

While in accordance with the Patent Statutes, the best mode and preferred embodiment have been set forth, the scope of the invention is not limited thereto, but rather by the scope of the attached claims.

What is claimed:

1. A composite article comprising
    a) a polar polymer or a metal having a tensile modulus of at least 130,000 psi, and being in the form of a molded article, sheet, or fibers; and
    b) a thermoplastic vulcanizate comprising
        (1) a dynamically crosslinked rubber,
        (2) from about 10 to about 400 parts by weight of a first polyolefin having a flexural modulus from about 5,000 psi (34.5 Mpa) to about 20,000 psi (138 Mpa) and a crystallinity of from about 10 to about 26.5 weight percent, and
        (3) from about 10 to about 200 parts by weight of a functionslized polyolefin having pendant polar functional groups, wherein said functional groups are present at a level of about 0.5 to about 3.5 mole percent of the total repeating units of said functionalized polyolefin and said functionalized polyolefin is derived from polymerizing at least one monoolefin to form a semicrystalline polymer or is derived from hydrogenating the polydiene blocks of a block copolymer,
    wherein said crosslinked rubber, said functionalized polyolefin, and said first polyolefin are interdispersed such that the thermoplastic vulcanizate is melt procossable in conventional thermoplastic processing equipment, and wherein said parts by weight are based upon 100 parts by weight of total rubber.

2. A composite article according to claim 1, wherein said fibers are present in the form of woven or non-woven fabric.

3. A composite article according to claim 2, wherein said fibers comprise a polyester, a polyamide, or polypropylene, or blends thereof.

4. A composite article according to claim 1, in the form of a membrane, tube, belting or hose.

5. A composite article according to claim 3, in the form of a membrane, tube, belting or hose.

6. A composite article according to claim 1, wherein said fiber and/or sheet of polar polymer is substantially encased in said thermoplastic vulcanizate.

7. A composite article according to claim 1, wherein said thermoplastic vulcanizate has adhesion to said polar polymer of at least 12 pli by ASTM D 1876-72.

8. A composite article according to claim 1, wherein said polar polymer is present as fibers of polyester, polyamide, or polypropylene, or blends thereof.

9. A composite article according to claim 1, wherein said functionalized polyolefin comprises maleic anhydride molecules grafted to a polyolefin backbone or to a hydrogenated polydiene block.

10. A composite article according to claim 1, wherein said polar polymer is a polyester, polyamide, or polyurethane or blends thereof.

* * * * *